US009991619B1

(12) United States Patent
Kee et al.

(10) Patent No.: US 9,991,619 B1
(45) Date of Patent: Jun. 5, 2018

(54) DUAL DIRECTION, ELECTRICAL BATTERY CONNECTOR AND ELECTRONIC DEVICE WITH A DUAL DIRECTION ELECTRICAL BATTERY CONNECTOR

(71) Applicant: MOTOROLA SOLUTIONS, INC., Chicago, IL (US)

(72) Inventors: Cheah Chan Kee, Pulau Pinang (MY); Chin Chin Ooi, Pulau Pinang (MY); Thomas D. Klump, Hollywood, FL (US); Adrian F. Rubio, Weston, FL (US); Peter Gilmore, Plantation, FL (US); Mohd Imran Bin Rosly, Kedah (MY); Boon Hoo Tee, Pulau Pinang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/597,009

(22) Filed: May 16, 2017

(51) Int. Cl.
*H01R 13/24* (2006.01)
*H01M 2/22* (2006.01)
*H01R 12/70* (2011.01)

(52) U.S. Cl.
CPC .......... *H01R 13/2435* (2013.01); *H01M 2/22* (2013.01); *H01R 12/7076* (2013.01)

(58) Field of Classification Search
CPC ........................ H01R 13/2442; H01R 13/2435
See application file for complete search history.

(56) References Cited

U.S. PATENT DOCUMENTS 6,077,130 A * 6/2000 Hughes .............. H01R 13/2442 439/65
6,315,621 B1 * 11/2001 Natori ................ H01R 13/2428 439/862
7,611,391 B2 * 11/2009 Long .................. H01R 13/2435 439/500
8,119,272 B2 * 2/2012 Chen ................... H01M 2/0207 429/100

FOREIGN PATENT DOCUMENTS

| | | |
|---|---|---|
| EP | 939457 | 9/1999 |
| GB | 2445380 | 7/2008 |
| WO | 2002021638 | 3/2002 |

* cited by examiner

*Primary Examiner* — Ross Gushi
(74) *Attorney, Agent, or Firm* — Michael Best & Friedrich LLP

(57) ABSTRACT

An electrical connector and an electronic device including the electrical connector. The electrical connector comprises a housing and an electrical contact. The housing includes a first wall oriented in a first direction, a second wall oriented in a second direction that is transverse to the first direction, and an aperture defined by the first wall and the second wall. The electrical contact is disposed within the aperture and has a singular structure with a first end and a second end opposite from the first end. A first portion of the electrical contact extends from the aperture in the second direction and is configured to deflect toward the first wall along the second direction. A second portion of the electrical contact extends from the aperture in the first direction and is configured to deflect toward the second wall along the first direction.

18 Claims, 6 Drawing Sheets

600

| | | |
|---|---|---|
| 602 | DROP - BACK | PASSED |
| 604 | DROP - SIDE | PASSED |
| 606 | DROP - BOTTOM | PASSED |
| 608 | DROP - TOP | PASSED |
| 610 | VIBRATION SIMULATION | ONE CONTACT DISCONNECT AND THE OTHER CONTACT STILL INTACT |
| 612 | CONCLUSION | EXCELLENT |

DUAL DIRECTION, ELECTRICAL BATTERY CONNECTOR AND ELECTRONIC DEVICE WITH A DUAL DIRECTION ELECTRICAL BATTERY CONNECTOR

BACKGROUND OF THE INVENTION

Batteries may be connected to devices and components (for example, a printed circuit board) via electrical contacts and connectors. Generally, an electrical connector electrically connects a battery contact disposed on the battery to the applicable components, and facilitates the transfer of electrical power from the battery to the applicable components.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
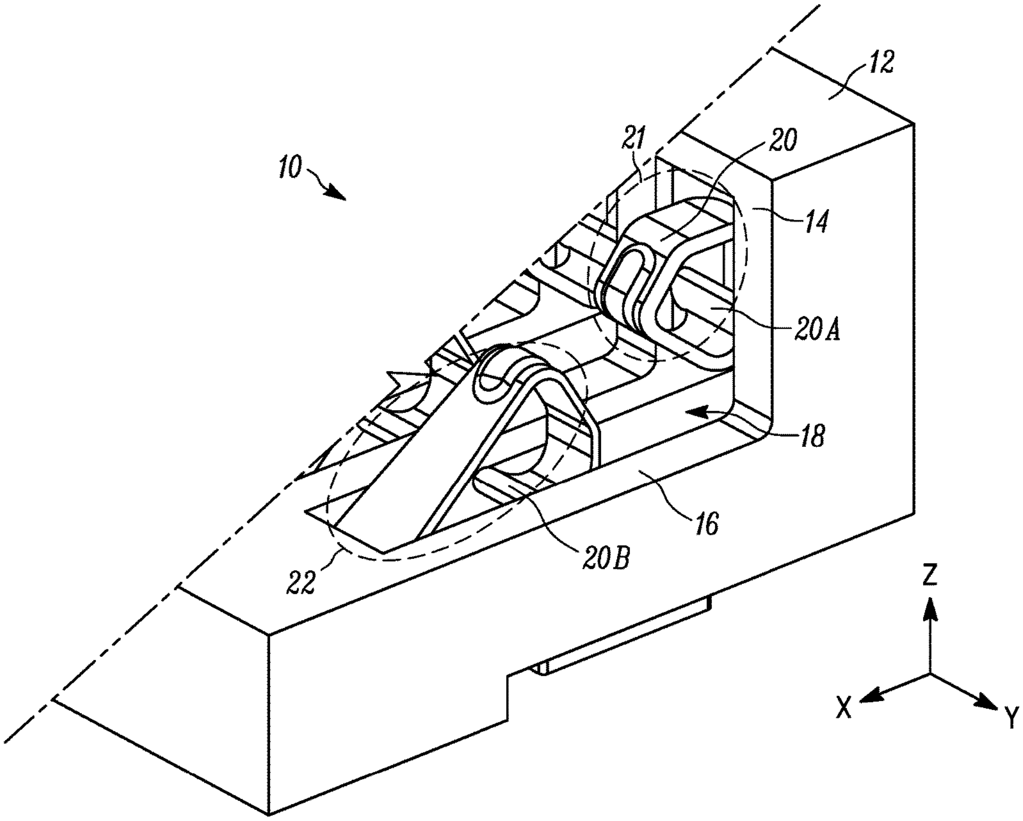
FIG. 1 is a diagram of an electrical connector, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some electrical connectors used with batteries include a static contact and a spring contact. Due to the nature of the spring contact, the electrical connector is subject to a debouncing event. Generally, a debouncing event is an interruption of an electrical connection between the electrical connector and a battery during an impact or shock to the battery. The debouncing event may result in an electronic device being reset or powered down. In some instances, the debouncing event may be of minimal consequence to a user's experience with the electronic device. However, in other instances, the debouncing event may be of significant consequence to the user and the user's experience with the electronic device (for example, when the debouncing event occurs in a device used by a first responder or other mission critical personnel).

Conventionally, a bifurcated contact or a blade contact has been used to prevent debouncing events. However, one problem associated with a bifurcated contact is when the impact or shock occurs in one direction both contacts of the bifurcated contact tend to move in the same direction. The survival rate of the bifurcated contact relies on a relatively small difference in position and contact with a battery between the two sections of the bifurcated contact. As a consequence, a bifurcated contact must be designed to exhibit a relatively high contact force. In some instances, the high contact force is a contact force equal to or greater than one hundred gram-force (gf). The high contact force subjects the bifurcated contact to fretting or wear due to highly cyclic action and friction against the bifurcated contact.

A blade contact differs from a bifurcated contact in that a blade contact of the device moves in one direction and a blade contact of the battery moves in the opposite direction. However, a blade contact is more expensive than a bifurcated contact. For example, in U.S. dollars, a bifurcated contact costs between thirty and sixty cents to manufacture, whereas a blade contact costs roughly three to five dollars to manufacture.

One embodiment provides an electrical connector that includes an electrical contact having a singular structure with a first portion and a second portion opposite to the first portion. The first portion and the second portion of the electrical contact are configured to have electrical contact with a battery contact in two primary directions (also referred to as "dual direction") that are transverse to each other. For example, when the electrical connector receives a force in a first direction, the first portion of the electrical contact oriented in one direction will bounce and disconnect, while the second portion of the electrical contact oriented in a direction transverse to the one direction will remain in contact and not disconnect.

Among other advantages, the cost of manufacturing certain embodiments is less than the cost of manufacturing a blade contact. In some embodiments, the cost to manufacture an electrical contact of the present disclosure is roughly the same as the cost to manufacture a bifurcated contact, while preventing a debouncing event like a blade contact.

Another embodiment provides an electrical connector comprising a housing and an electrical contact. The housing has a first wall oriented in a first direction, a second wall oriented in a second direction that is transverse to the first direction, and an aperture defined by the first wall and the second wall. The electrical contact is disposed within the aperture and has a singular structure with a first end and a second end opposite from the first end. A first portion of the electrical contact includes the first end and extends from the aperture in the second direction. The first portion is configured to deflect toward the first wall along the second direction. A second portion of the electrical contact includes the second end and extends from the aperture in the first direction. The second portion is configured to deflect toward the second wall along the first direction.

Yet another embodiment provides an electronic device comprising an electrical connector including a housing and an electrical contact. The housing has a first wall oriented in a first direction, a second wall oriented in a second direction that is transverse to the first direction, and an aperture defined by the first wall and the second wall. The electrical contact is disposed within the aperture and has a singular structure with a first end and a second end opposite from the first end. A first portion of the electrical contact includes the first end and extends from the aperture in the second direction. The first portion is configured to deflect toward the first wall along the second direction. A second portion of the electrical contact includes the second end and extends from the aperture in the first direction. The second portion is configured to deflect toward the second wall along the first direction.

FIG. 1 is a diagram of an electrical connector 10, in accordance with some embodiments. In the example of FIG. 1, the electrical connector 10 includes a housing 12 having a first wall 14 oriented in a first direction, a second wall 16 oriented in a second direction that is transverse to the first direction, and an aperture 18. The electrical connector 10 also includes an electrical contact 20 disposed in the aperture 18. FIG. 1 also shows a coordinate system with three axes: an X-axis, Y-axis, and a Z-axis.

The electrical contact 20 has a singular structure with a first end 20A and a second end 20B. A first portion 21 including the first end 20A extends from the aperture 18 in the second direction. The first portion 21 is configured to deflect towards the first wall 14 along the second direction. A second portion 22 including the second end 20B extends from the aperture 18 in the first direction. The second portion 22 is configured to deflect towards the second wall 16 along the first direction. The first and second portions 21 and 22 including the first and second ends 20A and 20B, respectively, are configured to act independently of each other in directions that are transverse to each other (for example, orthogonal). The independent action between the first and second portions 21 and 22 provides redundancy in the electrical connection with a battery contact. Additionally, the electrical contact 20 does not require a high contact force (for example, a contact force greater than one hundred gf) to prevent a debouncing event.

In some embodiments, the first direction is a direction along (for example, parallel to) the Z-axis and the second direction is a direction along (for example, parallel to) the X-axis. By deflecting in a direction along the X-axis, the first portion 21 including the first end 20A also provides better engagement with a battery because the first portion 21 including the first end 20A provides an additional holding force for retention of the battery.

In other embodiments, the first direction is a direction along (for example, parallel to) the X-axis or the Y-axis. For example, when the first direction is a direction along the X-axis, the second direction is a direction along the Y-axis or the Z-axis. Alternatively, for example, when the first direction is a direction along the Y-axis, the second direction is a direction along the X-axis or the Z-axis.

In some embodiments, the housing 12 comprises plastic. In some embodiments, the electrical contact 20 comprises metal, for example, stainless steel, phosphor bronze, spring brass, beryllium copper, or other suitable metal. Additionally, in some embodiments, the electrical contact 20 is a conductor that is configured to conduct approximately six amperes of electrical current.

In some embodiments, the first and second portions 21 and 22 of the electrical contact 20 including the ends 20A and 20B, respectively, are formed in a U-shape, as illustrated in FIG. 1. The bend in the U-shape may allow the first and second portions 21 and 22 to deflect into the housing 12 as described above. The bend in the U-shape may also allow the first and second ends 20A and 20B to deflect in addition to the deflection at the middle portion of the electrical contact 20. However, the first and second portions 21 and 22 of the electrical contact 20 may be any suitable shape and are not limited to the U-shape.

Figure 2:
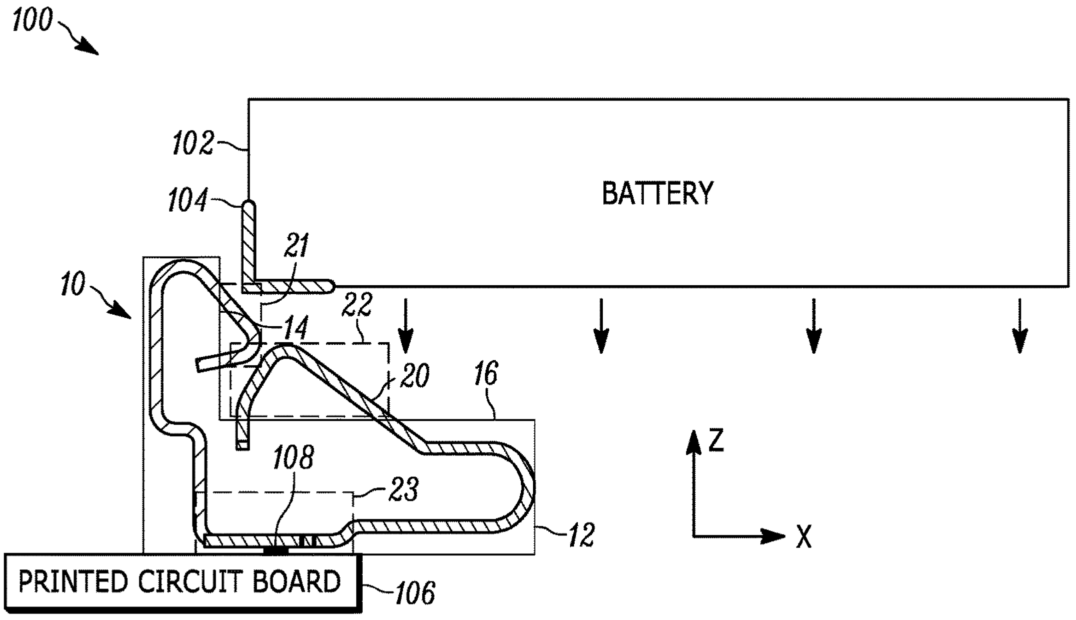
FIG. 2 is a diagram illustrating a battery system including a battery and the electrical connector of FIG. 1, in accordance with some embodiments.

FIG. 2 is a diagram illustrating a battery system 100 including a battery 102 and the electrical connector 10 of FIG. 1, in accordance with some embodiments. In the example of FIG. 2, the battery system 100 includes the electrical connector 10 as described above, a battery 102 with a battery contact 104, a printed circuit board 106, and a solder joint 108.

The battery 102 is not in mechanical communication with the electrical connector 10. However, the battery 102 is moving to become in mechanical communication with the electrical connector 10, as indicated by the downward arrows in FIG. 2.

In the example of FIG. 2, the battery contact 104 is disposed at one corner of the battery 102. Specifically, as illustrated in FIG. 2, a first portion of the battery contact 104 is oriented in a direction parallel to the Z-axis and a second portion of the battery contact 104 is oriented in a direction parallel to the X-axis. However, the disposition and orientation of the battery contact 104 shown is one example. Other dispositions and orientations of a battery contact are possible, as long as the battery contact deflects both of the first and second portions 21 and 22 of the electrical contact 20 as described above.

Additionally, in the example of FIG. 2, the printed circuit board 106 is electrically connected to the electrical contact 20 with solder joint 108. For example, as illustrated in FIG. 2, a middle portion 23 of the electrical contact 20 between the first and second portions 21 and 22 is electrically connected to the printed circuit board 106 by the solder joint 108. The solder joint 108 is shown as a single solder joint. However, in other embodiments, the solder joint 108 may be a plurality of solder joints.

Figure 3:
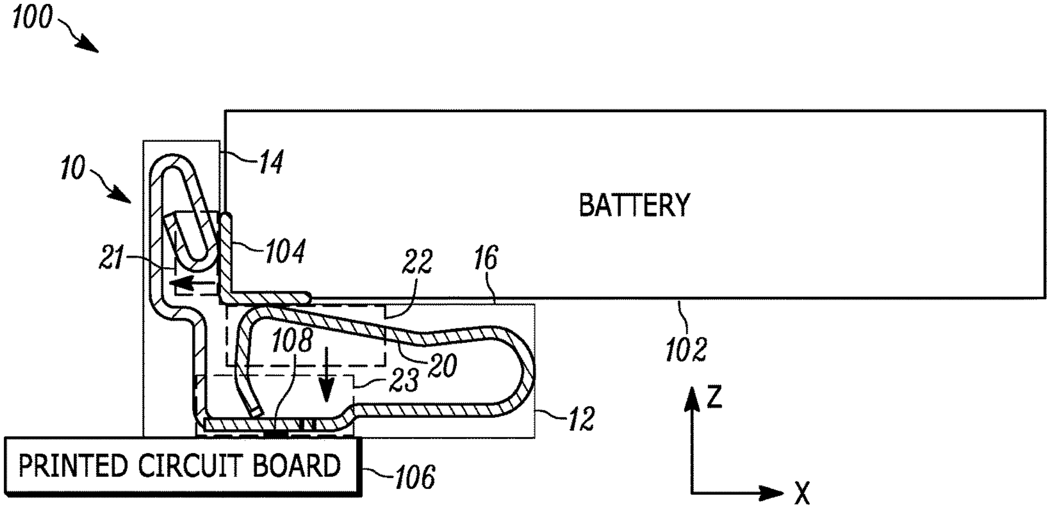
FIG. 3 is a diagram illustrating the battery system of FIG. 2 including the battery and the electrical connector of FIG. 1 in mechanical communication with the battery, in accordance with some embodiments.

FIG. 3 is a diagram illustrating the battery system 100 of FIG. 2 including the battery 102 and the electrical connector 10 of FIG. 1 in mechanical communication with the battery 102, in accordance with some embodiments. Specifically, the battery 102 is in mechanical communication with the electrical connector 10 establishing an electrical connection between the battery 102 and the printed circuit board 106 through the battery contact 104, the electrical contact 20, and the solder joint 108. As illustrated in FIG. 3, the first portion 21 including the first end 20A is deflected in a direction along the X-axis (for example, in a direction parallel to the X-axis) and into the housing 12 by a first section of the battery contact 104. Similarly, the second portion 22 including the second end 20B is deflected in a direction along the Z-axis (for example, in a direction parallel to the Z-axis) and into the housing 12 by a second section of the battery contact 104 that is different than the first section of the battery contact 104.

Figure 4:
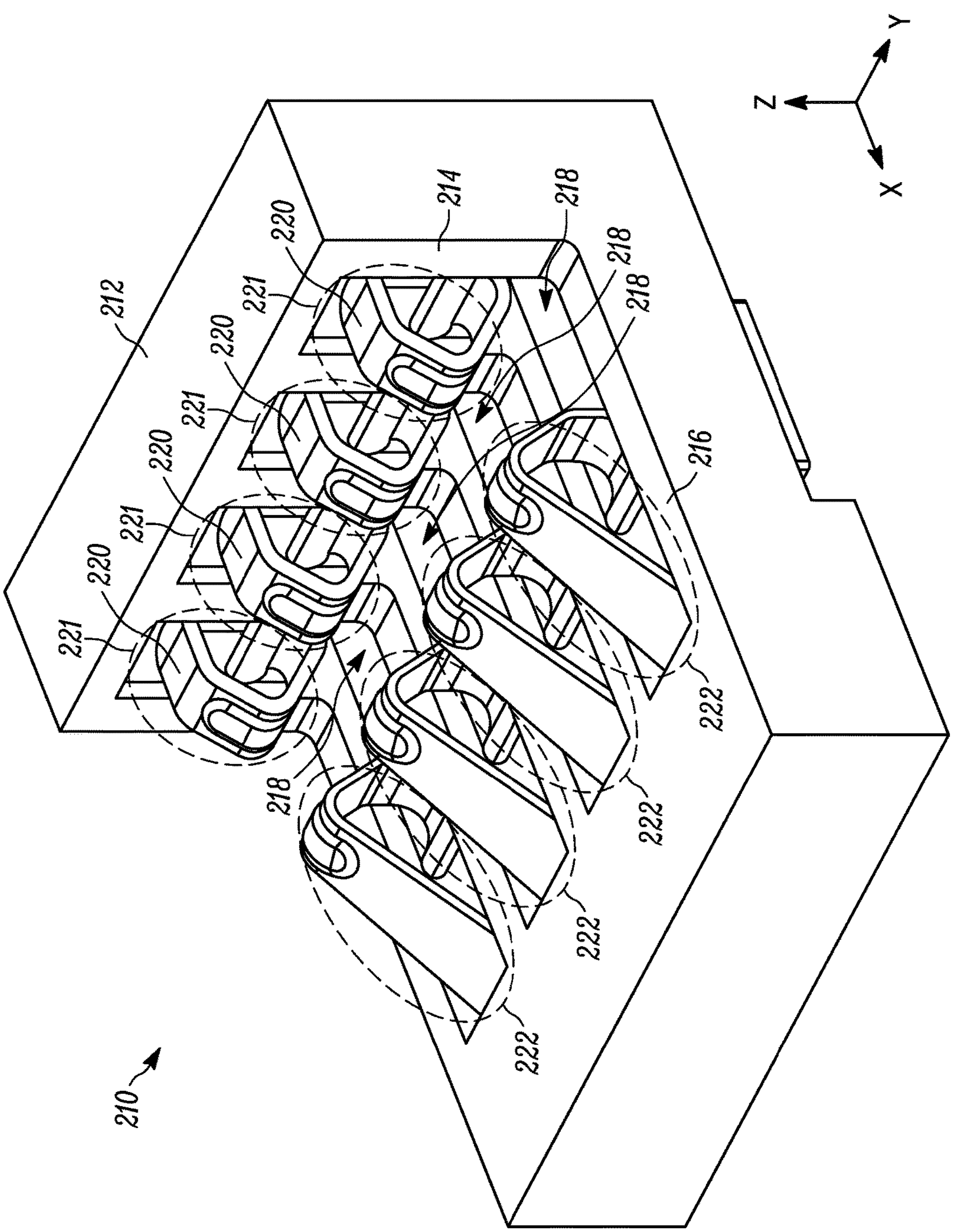
FIG. 4 is a diagram of another electrical connector, in accordance with some embodiments.

FIG. 4 is a diagram of another electrical connector 210, in accordance with some embodiments. In the example of FIG. 4, the electrical connector 210 includes a housing 212 having a first wall 214 oriented in a first direction, a second wall 216 oriented in a second direction that is transverse to the first direction, and a plurality of apertures 218 defined by the first wall 214 and the second wall 216. The electrical connector 210 also includes a plurality of electrical contacts 220 disposed in a corresponding one of the plurality of apertures 218. The plurality of electrical contacts 220 includes a plurality of first portions 221 and a plurality of second portions 222. The components of electrical connector 210 are similar to the components of electrical connector 10 as described above with respect to FIG. 1, and therefore further redundant description is not provided.

In some embodiments, some or all of the plurality of electrical contacts 220 are electrically connected together to form a joined contact or joined contacts with a printed circuit board (for example, the printed circuit board 106). In other embodiments, each of the plurality of electrical contacts 220 is electrically connected to a printed circuit board individually.

Additionally, in some embodiments, some or all of the plurality of electrical contacts 220 are varied with different shapes to provide different natural frequencies with respect to vibration and impact. The different natural frequencies will further prevent the debouncing event from occurring at all of the plurality of electrical contacts 220.

Figure 5:
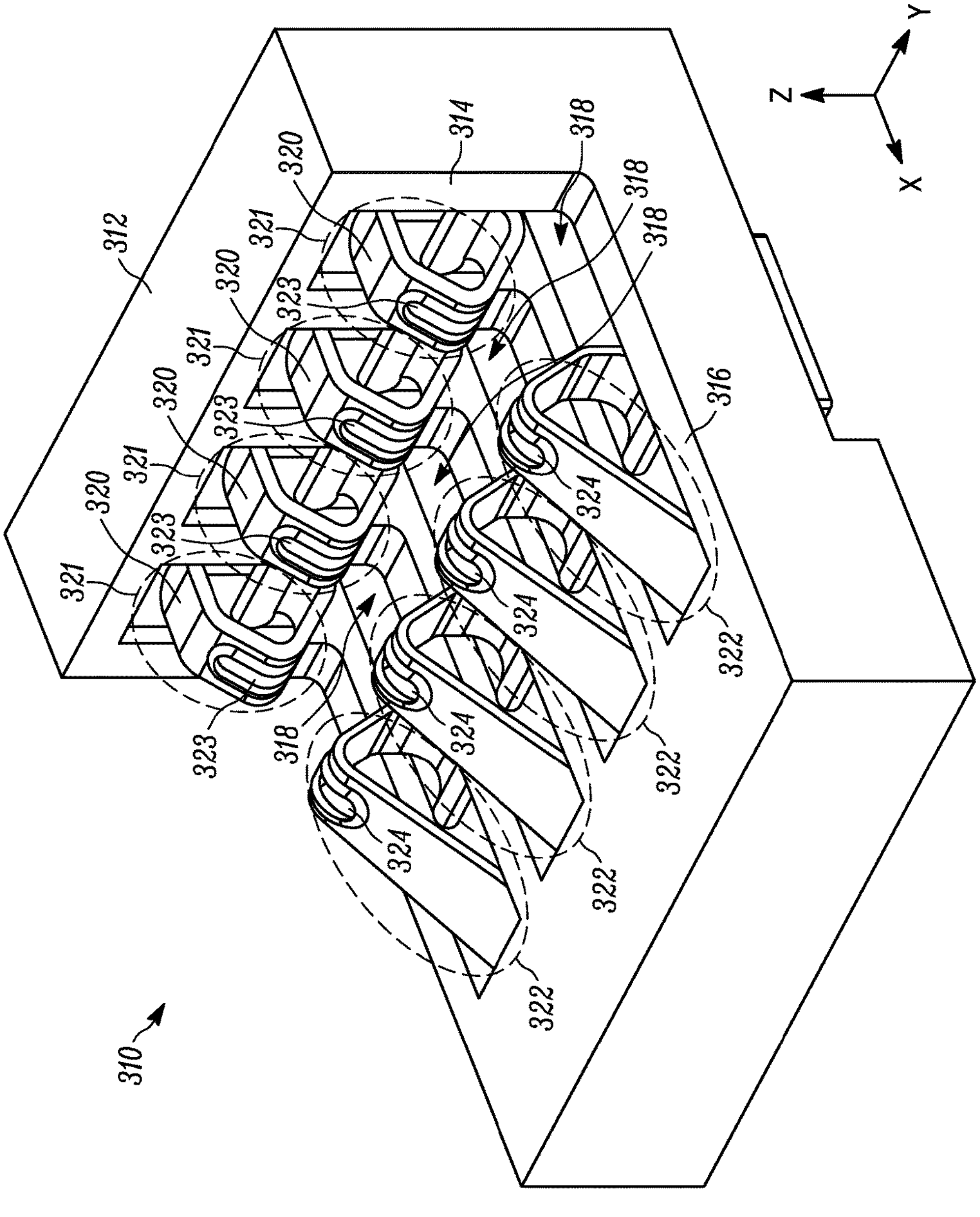
FIG. 5 is a diagram of yet another electrical connector, in accordance with some embodiments.

FIG. 5 is a diagram of yet another electrical connector 310, in accordance with some embodiments. In the example of FIG. 5, the electrical connector 310 includes a housing 312 having a first wall 314 oriented in a first direction, a second wall 316 oriented in a second direction that is transverse to the first direction, and plurality of apertures 318. The electrical connector 310 also includes a plurality of electrical contacts 320 disposed in a corresponding one of the plurality of apertures 318. The plurality of electrical contacts 320 includes a plurality of first portions 321 and a plurality of second portions 322. The components of electrical connector 310 are similar to the components of electrical connector 10 as described above with respect to FIG. 1, and therefore further redundant description is not provided.

In some embodiments, portions of some or all of the plurality of electrical contacts 320 include a bifurcated structure. For example, as illustrated in FIG. 5, the plurality of first portions 321 of the plurality of electrical contacts 320 that extend from the housing 312 in a direction along the X-axis include bifurcated structures 323. Similarly, as illustrated in FIG. 5, the plurality of second portions 322 of the plurality of electrical contacts 320 that extend from the housing 312 in a direction along the Z-axis include bifurcated structures 324.

Figure 6:
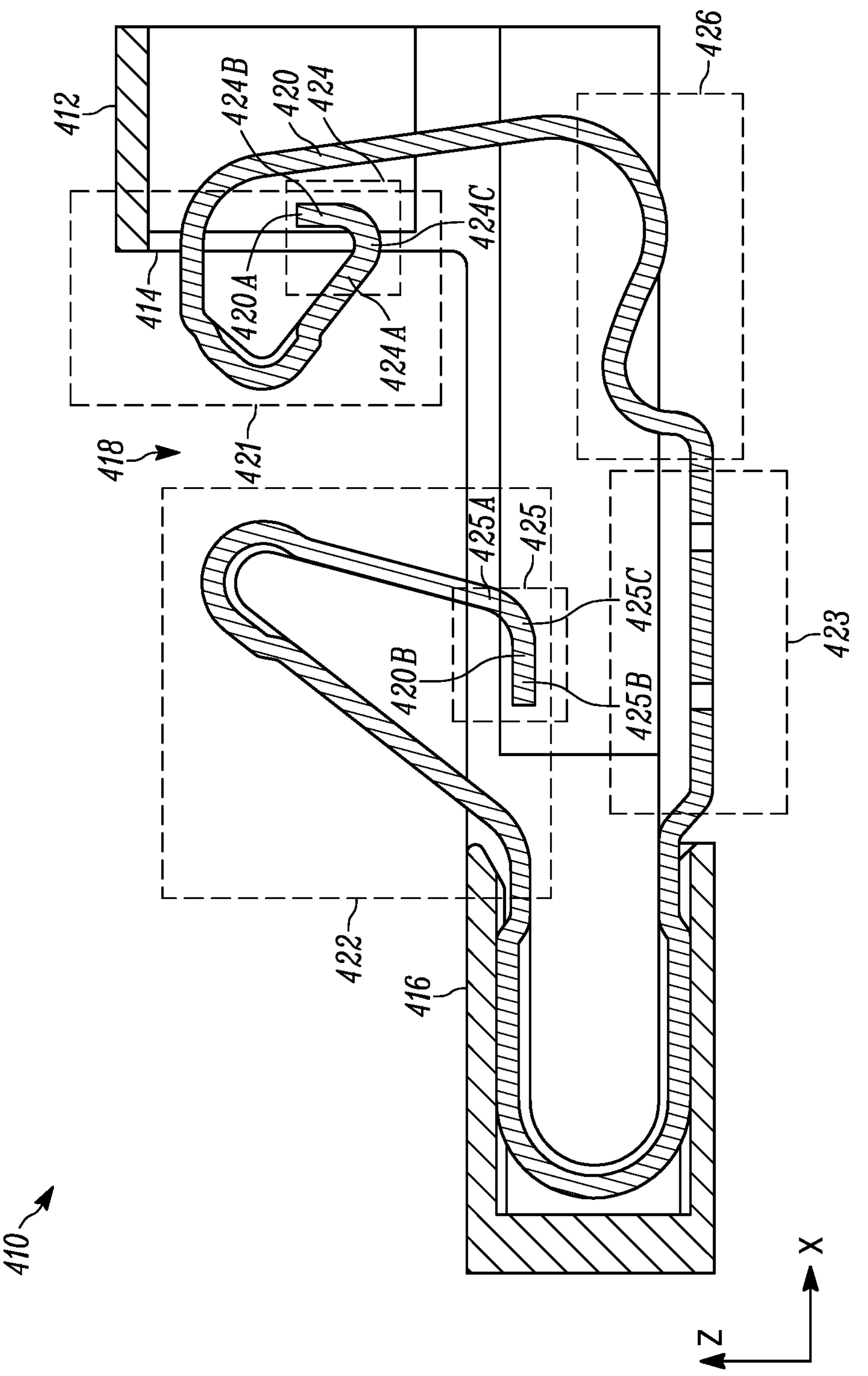
FIG. 6 is a diagram of another electrical connector, in accordance with some embodiments.

FIG. 6 is a diagram of another electrical connector 410, in accordance with some embodiments. In the example of FIG. 6, the electrical connector 410 includes a housing 412 having a first wall 414 oriented in a first direction, a second wall 416 oriented in a second direction that is transverse to the first direction, and an aperture 418 defined by the first wall 414 and the second wall 416. The electrical connector 410 also includes an electrical contact 420 disposed in the aperture 418. The electrical contact 420 has a first end 420A and a second end 420B. A first portion 421 of the electrical contact 420 including the first end 420A extends from the housing 412 in a direction along the X-axis. A second portion 422 of the electrical contact 420 including the second end 420B extends from the housing 412 in a direction along the Z-axis. A middle portion 423 of the electrical contact 420 is between the first portion 421 and the second portion 422. The components of electrical connector 410 are similar to the components of electrical connector 10 as described above with respect to FIG. 1. Therefore, as a consequence, detailed description of components that are similar in each of the embodiments is not provided.

Each of the first and second ends 420A and 420B of the electrical contact 420 may include a captivation feature. For example, as illustrated in FIG. 6, captivation feature 424 associated with the first end 420A and the captivation feature 425 associated with the second end 420B are "T" features that prevent a "pick out" by a user. A "pick out" occurs when a contact is pulled out of a protective slot in a plastic housing and causes deformation of the contact.

In the example of FIG. 6, the captivation feature 424 includes a first portion 424A, a second portion 424B, and a bend portion 424C. The first portion 424A is in a direction that is traverse to the Z-axis. The second portion 424B including the first end 420A is in a direction that is substantially parallel to the Z-axis. The bend portion 424C joins the first portion 424A to the second portion 424B. In some embodiments, an outer angle between the first portion 424A and the second portion 424B is less than one hundred and eighty degrees and greater than ninety degrees.

In the example of FIG. 6, the captivation feature 425 includes a first portion 425A, a second portion 425B, and a bend portion 425C. The first portion 425A is in a direction that is traverse to the X-axis. The second portion 425B including the second end 420B is in a direction that is substantially parallel to the X-axis. The bend portion 425C joins the first portion 425A to the second portion 425B. In some embodiments, an outer angle between the first portion 425A and the second portion 425B is less than ninety and greater than zero degrees.

In the example of FIG. 6, widths of the captivation features 424 and 425 extend a greater distance along the Y-direction than a width of the aperture 418 along the Y-direction. In this instance, the captivation feature 424 is configured to move within the housing 412 along the X-direction until the captivation feature 424 reaches the aperture 418 defined by the first wall 414 of the housing 412. Likewise, the captivation feature 425 is configured to move within the housing 412 along the Z-direction until the captivation feature 425 reaches the aperture 418 defined by the second wall 416 of the housing 412. The widths of the captivation features 424 and 425 being greater than the width of the aperture 418 prevents the "pick out" of the electrical contact 420.

Additionally, in some embodiments, the electrical contact 420 may include an additive length 426 adjacent to the middle portion 423. The additive length 426 is a bend (for example, a u-shaped bend as illustrated in FIG. 6) that increases the total length of a portion of the electrical contact 420 between the middle portion 423 and the first portion 421.

The additive length 426 may be used to prevent stress from being created in response to the deflection of the first portion 421. The additive length 426 may also be used to change a position of the first portion 421. An additive length similar to the additive length 426 may also be used with respect to the second portion 422.

In some embodiments, the electrical connector 410 is a singular electrical connector that is similar the electrical connector 10 as illustrated in FIG. 1. However, in other embodiments, the electrical connector 410 has a plurality of electrical contacts (for example, electrical connector 210 as illustrated in FIG. 4). For instance, some or all of the plurality of electrical contacts have a structure that is similar to the structure of the electrical contact 420 as illustrated in FIG. 6. In other instances, some of the plurality of electrical contacts has a structure that is similar to the structure of the electrical contact 420 as illustrated in FIG. 6, and some of the plurality of electrical contacts has a structure that is similar to the structure of electrical contact 20.

Figures 7, 8:
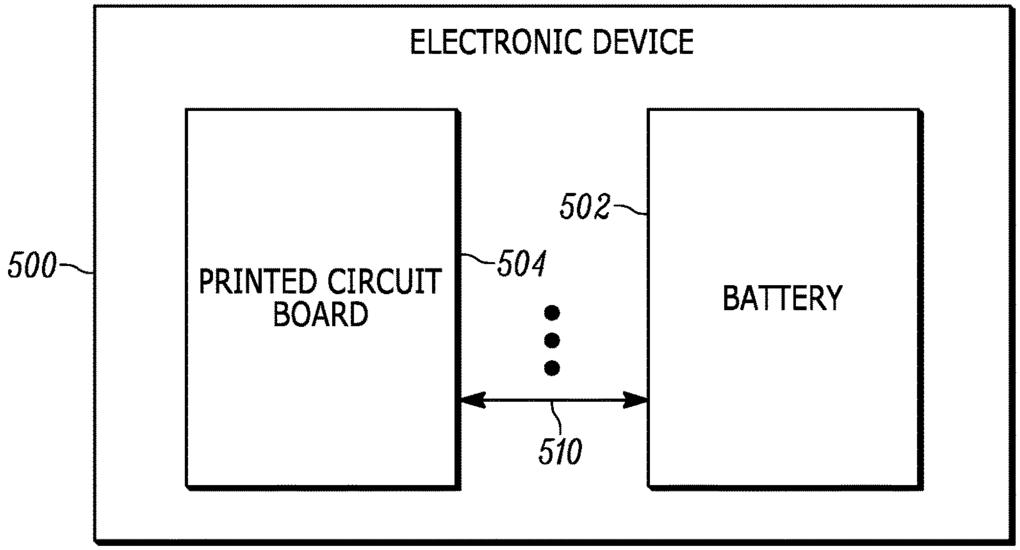
FIG. 7 is a block diagram of an electronic device including an electrical connector, in accordance with some embodiments.
FIG. 8 is a table representing outcomes of impact and vibration testing between a single contact, a bifurcated contact, and the electrical connector of FIG. 1, in accordance with some embodiments.

FIG. 7 is a block diagram of an electronic device 500 including an electrical connector 510, in accordance with some embodiments. In the example of FIG. 7, the electronic device 500 includes a battery 502, a printed circuit board 504, and the electrical connector 510 that electrically connects the battery 502 to the printed circuit board 504.

The electrical connector 510 may be any one of or a combination of the electrical connectors 10, 210, 310, and 410 as described above in FIGS. 1, 4, 5, and 6, respectively. In some embodiments, the electronic device 500 is one of a smartphone, a laptop, a tablet, a land-mobile radio, or other suitable electronic device.

FIG. 8 is a table 600 representing outcomes of impact and vibration testing of the electrical connector 10 of FIG. 1, in accordance with some embodiments. In the example of FIG. 8, rows 602 through 608 represent outcomes of a drop test, row 610 represents outcome of a vibration simulation using Finite Element Analysis (FEA), and row 612 represents the conclusion on the prevention of a debouncing event.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electrical connector comprising:

a housing having a first wall oriented in a first direction, a second wall oriented in a second direction that is transverse to the first direction, and an aperture defined by the first wall and the second wall; and an electrical contact disposed within the aperture, the electrical contact having a singular structure with a first end and a second end opposite from the first end, wherein a first portion of the electrical contact includes the first end and extends from the aperture in the second direction, the first portion is configured to deflect toward the first wall along the second direction, wherein a second portion of the electrical contact includes the second end and extends from the aperture in the first direction, the second portion is configured to deflect toward the second wall along the first direction, and wherein a middle portion of the electrical contact is between the first portion of the electrical contact and the second portion of the electrical contact, and the middle portion is configured to be soldered to a printed circuit board.

2. The electrical connector of claim 1, wherein the second direction is orthogonal to the first direction.

3. The electrical connector of claim 1, wherein the first portion of the electrical contact and the second portion of the electrical contact are configured to electrically contact different sections of a battery contact of a battery.

4. The electrical connector of claim 1, further comprising:

a plurality of electrical contacts including at least the electrical contact and a second electrical contact, wherein the housing further includes a plurality of apertures including at least the aperture and a second aperture, and wherein the second electrical contact is disposed in the second aperture.

5. The electrical connector of claim 4, wherein the second electrical contact has a singular structure with a first end and a second end opposite to the first end.

6. The electrical connector of claim 1, wherein the first portion of the electrical contact and the second portion of the electrical contact include a bifurcated structure.

7. The electrical connector of claim 1, wherein the first portion includes a first captivation feature, and wherein the second portion includes a second captivation feature.

8. The electrical connector of claim 1, wherein the first portion of the electrical contact is mechanically independent from the second portion of the electrical contact when the middle portion of the electrical contact is soldered to the printed circuit board.

9. The electrical connector of claim 8, wherein the first portion of the electrical contact has a first resonant frequency, and wherein the second portion of the electrical contact has a second resonant frequency that is different than the first resonant frequency.

10. The electrical connector of claim 1, wherein the first portion of the electrical contact has a first length and a first bend, and wherein the second portion of the electrical contact has a second length and a second bend that is different than the first length and the first bend.

11. An electronic device comprising:

a printed circuit board; and an electrical connector including a housing having a first wall oriented in a first direction, a second wall oriented in a second direction that is transverse to the first direction, and an aperture defined by the first wall and the second wall; and an electrical contact disposed within the aperture, the electrical contact having a singular structure with a first end and a second end opposite from the first end, wherein a first portion of the electrical contact includes the first end and extends from the aperture in the second direction, the first portion is configured to deflect toward the first wall along the second direction, wherein a second portion of the electrical contact includes the second end and extends from the aperture in the first direction, the second portion is configured to deflect toward the second wall along the first direction, and wherein a middle portion of the electrical contact is between the first portion of the electrical contact and the second portion of the electrical contact, and the middle portion is configured to be soldered to the printed circuit board.

12. The electronic device of claim 11, wherein the printed circuit board is soldered to the middle portion of the electrical contact.

13. The electronic device of claim 12, wherein the printed circuit board is soldered to only the middle portion of the electrical contact.

14. The electronic device of claim 11, wherein the first portion of the electrical contact is mechanically independent from the second portion of the electrical contact when the middle portion of the electrical contact is soldered to the printed circuit board.

15. The electronic device of claim 11, wherein the first portion of the electrical contact has a first length and a first bend, and wherein the second portion of the electrical contact has a second length and a second bend that is different than the first length and the first bend.

16. The electronic device of claim 15, wherein the first portion of the electrical contact has a first resonant frequency, and wherein the second portion of the electrical contact has a second resonant frequency that is different than the first resonant frequency.

17. The electronic device of claim 11, wherein the first portion of the electrical contact and the second portion of the electrical contact include a bifurcated structure.

18. The electronic device of claim 11, wherein the first portion includes a first captivation feature, and wherein the second portion includes a second captivation feature.

* * * * *